A. HILDRETH.
Mill Bolt.
No. 8,739.
2 Sheets—Sheet 1.
Patented Feb. 17, 1852.
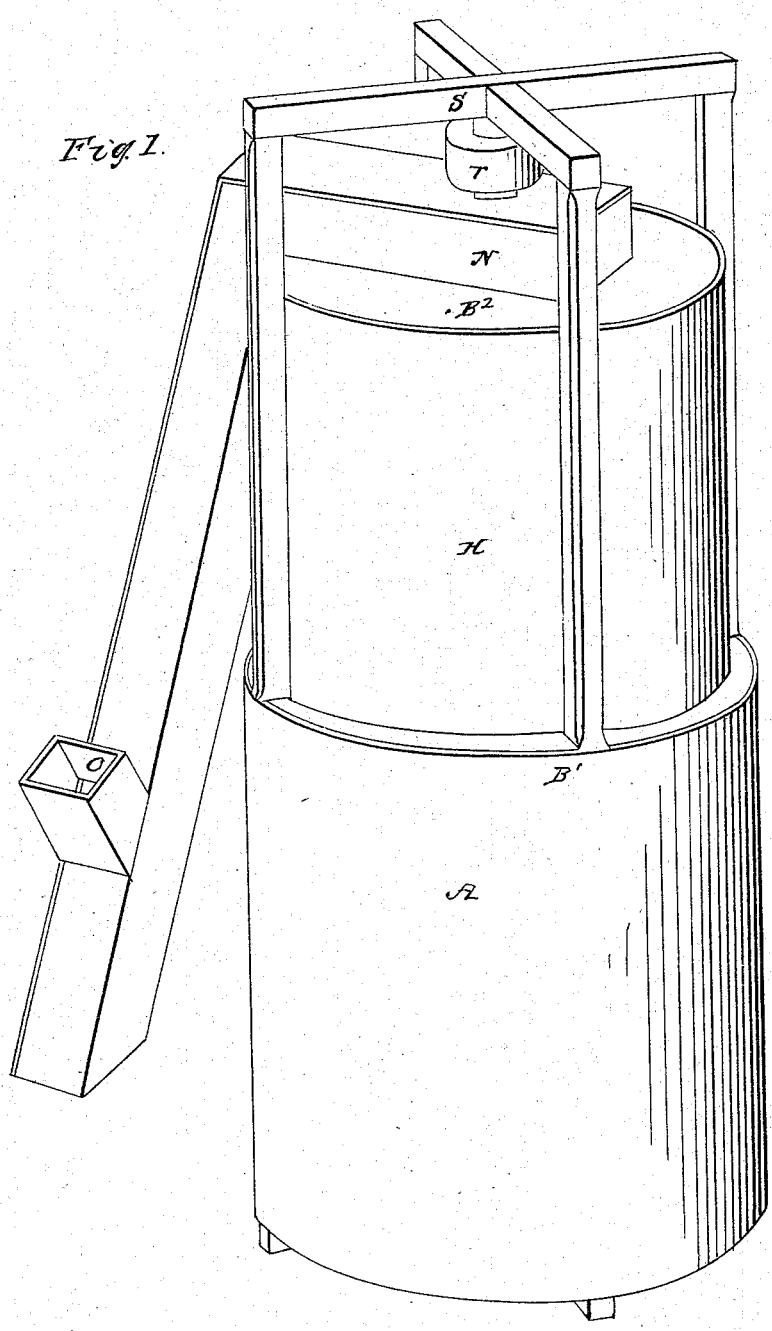

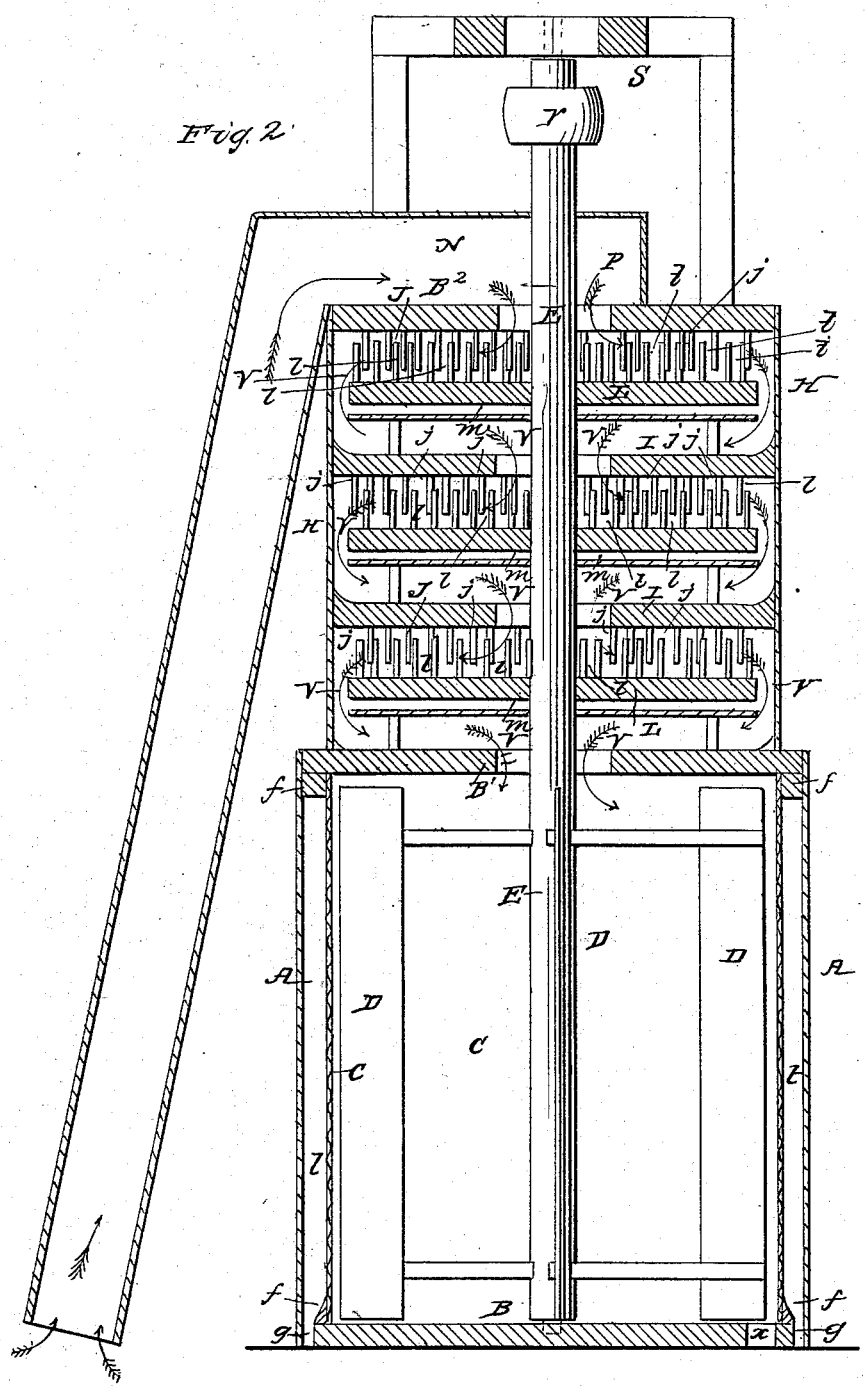

UNITED STATES PATENT OFFICE.

ABEL HILDRETH, OF NEWARK, OHIO.

BRAN-DUSTER.

Specification of Letters Patent No. 8,739, dated February 17, 1852.

*To all whom it may concern:*

Be it known that I, ABEL HILDRETH, of Newark, in the county of Licking and State of Ohio, have invented certain new and useful Improvements in Machines for Dusting Bran; and I do hereby declare that the following is a full, clear, and exact description of my said invention, reference being had to the accompanying drawings, which form part of this specification, and in which—

Figure 1 represents a view in perspective, and Fig. 2 a vertical section of my improved bran-duster.

My invention consists, first, in a new arrangement and combination of the several parts of the bolt or bran duster and its appendages, whereby the draft generated by the rotation of the beaters within the screen, which separates the flour and bran, shall act as a conveyer or elevator for the purpose of transferring the meal or bran from any part of the mill to the bolting or dusting apparatus, and shall at the same time cool the same while thus conveying them.

The second part of my invention consists of a series of pairs of toothed disks arranged in vertical order one above the other at such distance apart as will admit of the free passage of the meal or bran between them alternately from the center to the periphery between the disks of each pair, and from the periphery to the center between the pairs of disks, thus subjecting the material passing through the machine to such a thorough beating that all the lumps will be reduced to a state of fine dimension, and distributed into the screen with great evenness, which is essential to the complete separation of the flour from the bran.

The third part of my invention consists in interposing one or more stationary diaphragms between each pair of rotating disks so as to shield the current of mixed air and meal or bran in its passage from the periphery of one pair of disks to the center of the next, from the centrifugal action of the revolving disks which would in any case retard, the current and might under unfavorable circumstances neutralize it, and thus cause the machine to choke.

The bran duster represented in the accompanying drawings, is composed of two parts, the upper of which effects the scouring and beating of the meal or bran, and the lower the bolting or dusting thereof.

The bolting apparatus is contained within a cylindrical case A closed at the top and bottom by heads B, B'; it consists of a wire gauze cylinder C, and of a series of wings D, which are secured to radial arms projecting from an upright shaft E, that extends through the center of the gauze cylinder. The gauze of which the latter is formed is sufficiently coarse to permit the passage of flour, but is too fine to permit the passage of bran; it is secured to a skeleton cylindrical frame $f$, $f$ sufficiently within the outer casing to permit the flour that passes through it to descend freely to openings, $g$, in the lower head of the case through which it is discharged from the apparatus. The wings are similar to those of an ordinary fan, and are secured in such manner to their arms that their outer edges revolve almost in contact with the inner surface of the gauze cylinder. The upper head of the case is perforated at its center to permit the shaft to pass upward into the scouring apparatus above, and to permit the meal or bran to pass from the scouring to the bolting apparatus or screen.

The scouring apparatus is contained within a cylindrical case, H, which is secured to the upper head of the bolting apparatus and is in the same line therewith; it is traversed throughout its whole extent by the upright shaft, E, of the bolting apparatus beneath. This case is divided into three cylindrical scouring chambers by stationary disks I, I. These disks have openings at their centers to permit the passage of the bran from one chamber to the other, their lower faces and the lower face of the head $B^2$, of the case are studded with teeth $j, j, j, j, j, j$. That portion of the upright shaft which passes through each scouring chamber is fitted with a disk L, whose periphery extends within a short distance of the cylindrical sides of the chamber, the upper face of each of these disks is studded with teeth, $l$, which when the shaft is turning revolve between the teeth of the stationary disk. The lower face of each revolving disk is separated from the upper face of the stationary disk beneath it by a stationary annular diaphragm, $m$, which is at a sufficient distance from the stationary disk beneath to leave a passage for the bran from the periphery of the revolving disk to the central opening of the stationary disk beneath it.

The upper head of the case of the scouring apparatus has an opening, $p$, at its center to permit the entrance of the bran. An air trunk, N, is fitted to this opening; this air trunk extends to the side of the case and thence downward toward the floor upon which the apparatus is placed, its lower extremity being open to the air, and it is fitted near its open extremity with a spout, O, at which the bran to be scoured is introduced.

The upper extremity of the upright shaft extends through the air trunk and is fitted with a pulley, $r$, to which the driving belt is applied. The lower extremity of the shaft terminates in a pivot journal, which is stepped in a box secured to the lower head of the bolting apparatus. The upper extremity of the shaft also terminates in a journal which revolves in a box secured to a cross frame, S, above.

When the machine is in operation the upright shaft, E, is caused to revolve rapidly by the action of the driving belt. As the shaft revolves the wings, D, by their centrifugal action discharge the air from the casing through the wire gauze cylinder into the passage $t$, between it and the outer casing and thence, through the openings, $g$, in the lower head of the apparatus. The air thus discharged is continually replaced by fresh quantities of air which entering at the lower open extremity of the air trunk, N, pass upward in the direction of the arrows therein and enter the dusting apparatus at the central opening, $p$, in the upper head thereof. Thence the air passes in the direction indicated by the arrows $v, v, v, v$, through the whole series of scouring chambers and enters the bolting apparatus beneath. The meal to be bolted, or the bran to be dusted, is fed into the air trunk at the spout O, and being carried onward by the blast or current of air therein, is caused to pass successively through the whole series of scouring chambers to the bolting apparatus. As it passes through each chamber it is beaten and scoured by the action of the moving teeth of the revolving disks acting in connection with the corresponding teeth of the stationary disks. As the bran is discharged from the periphery of each revolving disk it is carried downward and inward by the current of air to the central opening which forms the entrance to the next succeeding scouring chamber. In its inward movement it is protected from the action of counter currents of air generated by the centrifugal action of the revolving disk by the annular diaphragms $m, m$, which being placed almost in contact with the lower faces of the revolving disks form the tops of the passages through which the meal or bran is returned by the blast from the peripheries of one pair of disks to the central opening which admits its between the disks of the next succeeding scouring chamber. The bran from the last scouring chamber enters the center of the bolting apparatus, and by the centrifugal action of the wings is projected forcibly against the wire gauze; by this means the fine flour is caused to pass with the air through the meshes of the wire gauze and is discharged at the openings, $g$, in the lower head; while the bran falls within the wire gauze and is discharged through suitable openings, $x$, also formed in the lower head of the apparatus, into a spout which prevents its remixing with the flour and conveys it into any suitable receptacle.

It is obvious that the air trunk may be extended to any part of the mill to receive the meal or bran in whatever situation it may happen to be, and transfer it to the bolt or duster.

If both disks in each scouring chamber are made to revolve, it is obvious that two annular diaphragm shields will be required between each pair of disks, the one to form the top and the other the bottom of the passage for the current of air, &c., from the periphery of one pair of disks to the center of the next.

What I claim as my invention and desire to secure by Letters Patent, is—

1. The arrangement and combination of the several parts of a bolt or bran-duster in such manner that the draft generated by the rotation of the beaters within the bolting screen shall act as a conveyer or elevator for the purpose of transferring the bran or meal from any portion of the mill to the bolting or dusting apparatus, and shall at the same time cool the bran or meal thus conveyed.

2. I also claim the scouring apparatus herein described consisting of a series of pairs of toothed disks arranged in vertical order above each other at such distances apart as will admit of the free passage of the meal or bran between them alternately from the center to the periphery between the disks of each pair and from the periphery to the center between the pairs of disks.

3. I likewise claim the method herein described of shielding the current of mixed air and meal or bran from the centrifugal action of the revolving disks by means of stationary diaphragms arranged as herein set forth.

In testimony whereof I have hereunto subscribed my name.

ABEL HILDRETH.

Witnesses:
E. S. RENWICH,
P. H. WATSON.